United States Patent [19]

Zibell

[11] Patent Number: 4,885,175
[45] Date of Patent: Dec. 5, 1989

[54] METHOD OF MAKING CHEWING GUM WITH WAX-COATED DELAYED RELEASE INGREDIENTS

[75] Inventor: Steven E. Zibell, Palos Heights, Ill.

[73] Assignee: Wm. Wrigley Jr. Company, Chicago, Ill.

[21] Appl. No.: 137,114

[22] Filed: Dec. 23, 1987

[51] Int. Cl.⁴ ................................................ A23G 3/30
[52] U.S. Cl. ........................................ 426/5; 426/99; 426/302; 426/307; 426/548; 426/804
[58] Field of Search ........................................ 426/3–6, 426/548, 99, 302, 307, 804

[56] References Cited

U.S. PATENT DOCUMENTS

| | | | |
|---|---|---|---|
| Re. 29,682 | 6/1978 | Cella et al. | 426/548 |
| 3,262,788 | 7/1966 | Swanson et al. | 99/199 |
| 3,753,739 | 8/1973 | Cella et al. | 99/141 |
| 3,922,354 | 11/1975 | Galluzzi et al. | 426/96 |
| 3,928,633 | 12/1975 | Shoaf et al. | 426/96 |
| 3,956,507 | 5/1976 | Shoaf et al. | 426/96 |
| 3,962,468 | 6/1976 | Pischke et al. | 426/96 |
| 4,004,039 | 1/1977 | Shoaf et al. | 426/548 |
| 4,059,706 | 11/1977 | Pischke et al. | 426/548 |
| 4,139,639 | 2/1979 | Bahoshy et al. | 426/3 |
| 4,230,687 | 10/1980 | Sair et al. | 424/22 |
| 4,384,004 | 5/1983 | Cea et al. | 426/3 |
| 4,384,005 | 5/1983 | McSweeney | 426/250 |
| 4,465,694 | 8/1984 | Okada | 426/99 |
| 4,495,213 | 1/1985 | Wolf et al. | 426/548 |
| 4,497,835 | 2/1985 | Winston | 426/72 |
| 4,517,214 | 5/1985 | Shoaf et al. | 426/548 |
| 4,554,167 | 11/1985 | Sorge et al. | 426/285 |
| 4,556,565 | 12/1985 | Arima et al. | 426/3 |
| 4,568,560 | 2/1986 | Schobel | 427/3 |
| 4,579,747 | 1/1986 | Sugiyama et al. | 426/548 |
| 4,597,970 | 7/1986 | Sharma et al. | 426/5 |
| 4,634,593 | 1/1987 | Stroz et al. | 426/5 |
| 4,704,288 | 11/1987 | Tsau et al. | 426/99 |

FOREIGN PATENT DOCUMENTS

| | | | |
|---|---|---|---|
| 675004 | 11/1963 | Canada | 426/285 |
| 86810619 | 7/1987 | European Pat. Off. | |
| 87300375 | 7/1987 | European Pat. Off. | |
| 87301903 | 9/1987 | European Pat. Off. | |
| 59-95862 | 6/1984 | Japan | |
| 58-157509 | 3/1985 | Japan | |
| 1274905 | 5/1972 | United Kingdom | 426/285 |
| 1301770 | 1/1973 | United Kingdom | |

*Primary Examiner*—Jeanette Hunter
*Attorney, Agent, or Firm*—Willian Brinks Olds Hofer Gilson & Lione

[57] ABSTRACT

A process is disclosed for making chewing gum with a wax-coated delayed release ingredient. According to the method, a quantity of a powdered ingredient, such as a high-potency sweetener, is heated and mixed with a quantity of molten wax, such as a polyethylene wax. Preferably, the quantity of wax is limited so as to produce a damp mix which is characterized as being dust-free, non-flowing and crumbly. The damp mixture is then cooled in order to solidify. The cooled mix is then treated, e.g. by grinding and/or screening, to produce the desired particle size range in the coated ingredient particles.

24 Claims, 3 Drawing Sheets

METHOD OF MAKING CHEWING GUM WITH WAX-COATED DELAYED RELEASE INGREDIENTS

BACKGROUND OF THE INVENTION

The present invention relates to methods for making chewing gum with delayed release ingredients.

In recent years, various efforts have been devoted to controlling the release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. On the other hand, some ingredients have been treated so as to increase their rate of release in chewing gum. In addition, other efforts have been directed at delaying or preventing altogether the release of active ingredients in the chewing gum formulation during storage of the gum, to thereby increase the stability of the ingredient over time.

For example, U.S. Pat. No. 4,597,970 to Sharma et al., teaches a process for producing an coated sweetener wherein the sweetener is dispersed in a hydrophobic matrix consisting essentially of lecithin, a glyceride, and a fatty acid or wax having a melting point between 25° and 100° C. The method disclosed uses a spray congealing step to form the sweetener-containing matrix into droplets followed by a fluid bed second coating on the coated particles.

U.S. Pat. Nos. 4,515,769 and 4,386,106, both to Merrit et al., teach a two step process for preparing a delayed release flavorant, such as an essential oil, for chewing gum. In this process, the flavorant is prepared in an emulsion with a hydrophyllic matrix. The emulsion is dried and ground and the particles are then coated with a water impermeable substance.

U.S. Pat. No. 4,230,687, to Sair et al., teaches a process for encasing an active ingredient to achieve gradual release of the ingredient in a product such as chewing gum. The method described involves adding the ingredient to an encapsulating material in the form of a viscous paste. High shear mixing is used to achieve a homogeneous dispersion of the ingredient within the matrix which is subsequently dried and ground.

U.S. Pat. No. 4,139,639, to Bahoshy et al., teaches a process of "fixing" aspartame by co-drying (by spray or fluid bed drying) a solution containing aspartame and an encapsulating agent, such as gum arabic, to thereby surround and protect the aspartame during storage in the gum.

U.S. Pat. No. 4,384,004, to Cea et al., teaches a method of encapsulating aspartame with various solutions of encapsulating agents using various encapsulation techniques such as spray drying in order to increase the shelf-stability of the aspartame.

U.S. Pat. No. 4,634,593 to Stroz et al., teaches a method for producing delayed release sweeteners for confections, such as chewing gum. The method taught therein involve the use of an insoluble fat material which is mix mulled with the sweetener.

Naturally, the processes which use spray drying or fluid bed coating techniques for encapsulating the ingredients involve a relatively large investment in equipment and require skilled operating personnel and sophisticated process controls.

SUMMARY OF THE INVENTION

The present invention is directed to improved methods for producing chewing gum with delayed release ingredients. Briefly stated, the methods of the present invention generally comprise the following steps. A quantity of a powdered ingredient is mixed with molten wax to produce a damp mix. The damp mix is then allowed to cool and harden. The hardened mixture is treated, e.g. by grinding and/or screening, to produce the desired particle size range in the wax-coated ingredient particles. These wax coated particles are then incorporated into a chewing gum formulation.

In accord with one preferred embodiment of the present invention, the ingredient to be treated is the high-potency sweetener known as acesulfame K. The mixing is accomplished in a planetary or other type mixer which affects compressive forces between the components and which mixer is fitted with means such as a steam jacket for supplying heat to the mixing bowl. Preferably, the wax is melted before it is added to the mixing bowl. Also, the acesulfame K is preferably heated to the temperature of the molten wax before the wax is added. Preferably, the quantity of the molten wax is limited so as to produce a mixture which is only moist or damp. This damp mixture is characterized as being dust-free, non-flowing and crumbly.

The present invention offers advantages in that it provides a relatively simple and inexpensive method for treating ingredients to produce a delayed release in chewing gum. In particular, the method of the present invention can be carried out in a relatively short time and using relatively simple equipment. It was a surprising result that this relatively simple and inexpensive process could produce coated ingredients with delayed release profiles similar to ingredients treated by more complicated and expensive processes. Moreover, although the present invention may be carried out in a continuous process, it is also well suited for batch processes. This is particularly important in view of the small quantities of the ingredients typically used.

It should be noted that the phrase "delayed release ingredient" as used in this specification and the appended claims is intended to refer to an ingredient which has been treated so as to exhibit a slower release profile than the ingredient possesses without such treatment. In the context of the present invention, the phrase "delayed release" can also refer to increasing the shelf-life stability of an ingredient in chewing gum by preventing or delaying release of the ingredient into the chewing gum during storage. In other words, causing the ingredient to have a "delayed release" can also refer to protecting the ingredient from the other components of the chewing gum during storage.

It should also be noted that the term "wax" as used in this specification and the appended claims is intended to have a relatively broad interpretation including various types of waxes of animal, vegetable, mineral or synthetic origin. Examples of such waxes include, but are not limited to, polyethylene wax, paraffin wax, microcrystalline wax, beeswax, carnauba wax, and the like.

The above-described advantages of the present invention, as well as others, will become apparent from the following description which, when taken in conjunction with the accompanying figures, discloses presently preferred methods of the present invention.

DETAILED DESCRIPTION

Figure 1:
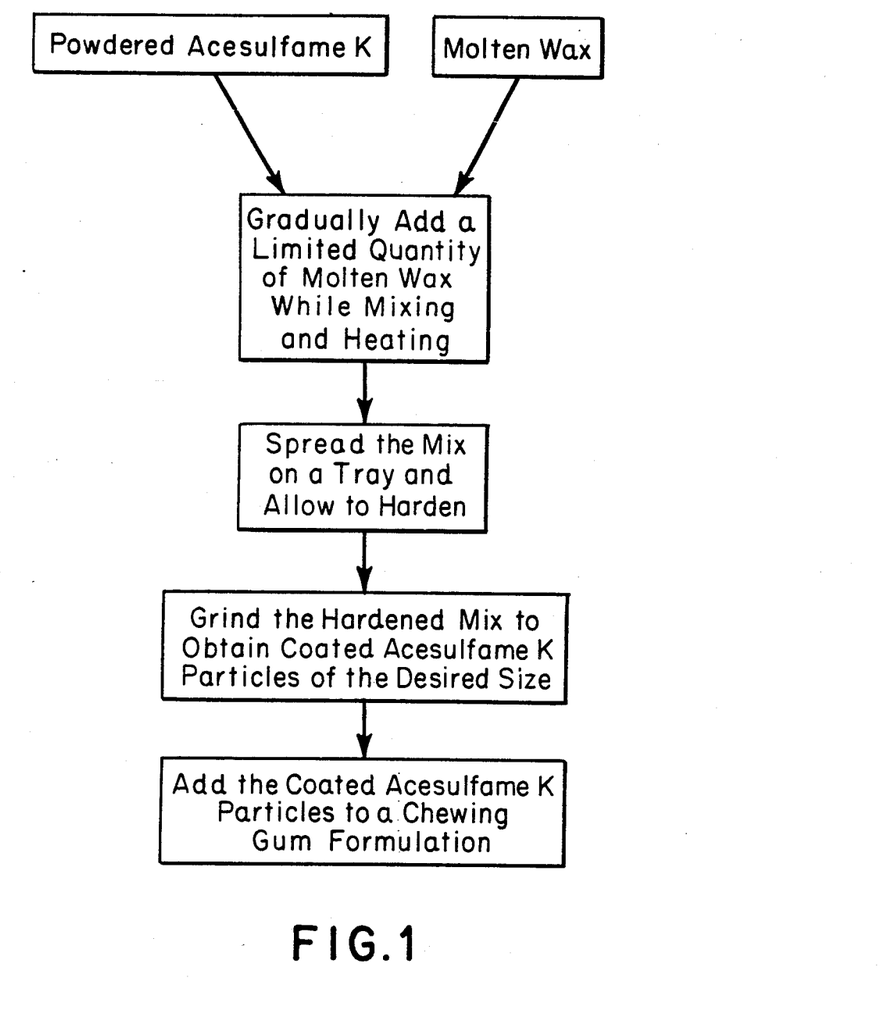
FIG. 1 is a schematic representation of the preferred method of the present invention.

Referring to the drawings, FIG. 1 is a block diagram illustrating the steps in the process of the preferred embodiment of the present invention. First, a quantity of powdered ingredient is added to the bowl of a mixer.

The powdered ingredient can be selected from a wide variety of chewing gum ingredients, such as sweeteners, flavors, acidulants, medicaments, etc. Preferably, the ingredient is a high-potency sweetener, such as a salt of acesulfame, aspartame, alitame, sucralose, sacharine and its salts, cyclamic acid and its salts, dihydrochalcones, thaumatin, and monellin, and the like.

In the most preferred embodiments, the high-potency sweetener used in this invention is a salt of 6-methyl-1.2.3-oxathiazin-4(3H)-one-2.2-dioxide, generally known as acesulfame. The potassium salt, generally known as acesulfame K, is the most popular form. Acesulfame K can be obtained from HOECHST AG under the trade name "Sunett®".

In alternatively preferred embodiments, the high-potency sweetener is a dipeptide sweetener such as those known as aspartame or alitame. The dipeptide sweetener can be aspartame, i.e. the methyl ester of L-aspartyl L-phenylalanine. The aspartame used can be obtained from the NUTRASWEET Company under their designation "NutraSweet®". This aspartame is in powdered form with generally needle shaped crystals having a wide range of particle sizes. The aspartame crystals are relatively small and needle-like. Accordingly, this powder is generally considered difficult to work with because of its poor flowability and low bulk density. In addition, it is relatively difficult to coat these individual aspartame crystals because of their small size and needle-like shape.

Alternatively, the high-potency dipeptide sweetener can also be L-aspartyl-D-alanine 2,2,4,4 tetramethyl-thienyl-amide, generally known as alitame.

The present invention also contemplates the inclusion of more than one ingredient. That is, two or more chewing gum ingredients may be mixed together before or during the present process. For example, it may be desirable to blend a sweetener and a flavor together so as to produce wax-coated particles that will cause a delayed release of both ingredients. In addition, it may be preferred to blend two different sweeteners in order to obtain synergy and the most desirable sweetness profile of the chewing gum. It is known in the art to combine sweeteners to mask undesirable aftertastes, and the like.

It may also be preferred to blend a high-potency sweetener with a bulking agent. For example, when using a sweetener such as thaumatin or monellin, each of which have such a high sucrose equivalent, i.e. about 2000, it may be desirable to add a bulking agent such as mannitol, maltodextrin, gum arabic, starch, sugar, or the like.

As mentioned above, the powdered ingredient is placed in the bowl of a mixer. Preferably, the powdered ingredient is heated within the bowl to the temperature at which the molten wax will be added. It has been found that having the powdered ingredient at this temperature is beneficial to the process because the wax stays molten while the powdered ingredient is being coated. Naturally, it is difficult, if not impossible, to coat the powdered ingredient if the wax is not in a molten, i.e. liquid, state.

Once the powdered ingredient has been heated to the desired temperature, the molten wax is added to the bowl. The wax used in this invention should have a melting point of greater than about 130° F. This relatively high melting point is important for at least three reasons. First, the higher melting point wax is better suited for grinding or other particle sizing operations. That is, the higher melting point waxes will be less likely to soften during a typical grinding operation.

A second reason why the melting point of the wax should be above about 130° F. is that the higher melting point wax is necessary in order for the wax-coated particles to be incorporated during a conventional gum making process. In particular, chewing gum is typically manufactured by blending the various ingredients into melted gum base which is usually maintained at a temperature between about 110° and about 130° F. Accordingly, if a wax was used with a melting point below the gum manufacturing temperature, the benefits of the coating would be lost.

Finally, the higher melting point wax is important because it is less likely to interfere with the rheological properties, i.e. the chewing properties, of the final gum product. In particular, lower melting point wax are often used as softening or plasticizing agents in chewing gum formulations. A higher melting point wax, however, would be less likely to impact the rheological properties because it is more physically inert.

Various natural or synthetic waxes may be used in the present invention. These waxes can originate from animal, vegetable, or mineral sources. As mentioned above, it is important that the wax melt above about 130° F. In addition, it is important that the wax not possess flavor or texture properties incompatible with the chewing gum.

Preferably, the wax used in the present invention is synthetic in origin. Most preferably, the wax is a long chain polymer of ethylene with a molecular weight between about 500 and about 2000. Such compounds are referred to herein as polyethylene waxes. Preferably, the polyethylene wax has a melting point above about 155° F. More preferably, the melting point of the polyethylene wax is about 187° F. Other synthetic waxes such as carbowaxes and halowaxes can also be used.

Alternatively, the wax used is derived from petroleum. In accordance with another preferred embodiment, paraffin wax with a melting point of about 135° F. is used. More preferably, the melting point of a paraffin wax used in the invention is about 180° F. Other waxes derived from petroleum can also be used. For example, microcrystalline waxes with a melting point above 130° F. are well suited for use in the present invention.

Examples of natural waxes from animal and plant sources which can be used with the present invention include, but are not limited to, beeswax, candelilla wax, sugarcane wax, and carnauba wax. All of these types of wax can be used so long as they have the appropriate melting point.

The present invention contemplates the simultaneous use of more than one wax. For example, two or more different types or grades of wax can be blended so as to modify the properties of the wax as a whole. Most typically, two waxes can be blended to achieve the particular melting point desired for the blend. When two or more waxes are blended for use in the present invention, it is important that the melting point of the blend be above about 130° F.

The present invention also contemplates the use of more than one coating step whereby more than one layer of wax can be applied to the particles. Because the wax is added in a molten state, it is important for the wax in the first coat to have a melting point higher than the wax in the second coat. In addition, it may also be desirable to use the present invention to apply a coating of wax to particles which have previously been coated by a different type of coating material. Likewise, it may also be desirable to use the present invention to apply a coating of wax to particles in preparation for those particles to coated subsequently by a different type of coating material.

The total amount of molten wax added to the powdered ingredient in the mixing bowl is preferably limited so as to produce a damp, dust-free, non-flowable, non-extrudable, crumbly mixture. By the word "crumbly" it is meant that the damp mix easily separates from itself. By way of comparison, the preferred damp mix should have the consistency and texture of wet sand. By way of contrast, the preferred damp mix should not have so much wax that it becomes dough-like, paste-like, clay-like, or soup-like. It has been found that, if the mix does go to the dough-like stage, some of the advantages of the present invention are lost. In particular, the dough-like mix can be more difficult to mix, handle, and cool.

The amount of molten wax needed to produce a mix of this consistency will vary depending on the specific wax chosen and the specific ingredient to be coated. Preferably, the amount of molten wax is between about 10 and about 50 weight percent of the damp mix, more preferably between about 15 and about 45 weight percent, and most preferably between about 25 and about 40 weight percent. The preferred method of adding the molten wax to the powdered ingredient is to add it in small amounts in time spaced increments while continuously mixing. When adding the molten wax this way, it is desirable to allow the mix to become homogeneous before the next addition of molten wax. In following this preferred method, the molten wax is allowed to be distributed evenly into the mixture without producing pools of molten wax which can result in large clay-like lumps in the mixture.

It is possible to determine the proper amount of molten wax by visually monitoring the condition of the damp mix. The characteristics mentioned above, namely dust-free, non-flowable, and crumbly, are relatively easy to observe and contrast with the cohesiveness, and flowability of the dough-like stage.

Naturally, once the optimum weight ratio of wax to ingredient is determined, that optimum amount will be reproducible.

After the last of the molten wax is added, the combination is continuously mixed for a time sufficient to allow for a homogenous mass. In particular, the powdered ingredient and the molten wax should be evenly dispersed in the mix. The optimum time of mixing can be determined visually.

The type of mixing affected on the mix is believed to be important to the present invention. In particular, it is believed that a compressive type mixing is important in order to push the molten wax and the particles of ingredient together into clusters. This is contrasted with a high shear type mixing which would act to separate the components of the damp mix. Accordingly, the preferred type of mixer is a planetary mixer or other type mixer that would produce similarly compressive type mixing.

It is preferable to continue to supply heat to the mixing bowl during this mixing process so that the molten wax is maintained above its melting point. Although, the mix can be allowed to cool some during the mixing, this would naturally increase the power needed to mix as the wax begins to solidify.

After the final mixing, the damp mix is allowed to cool and harden. The cooling is preferably accomplished by taking the damp mix out of the mixer bowl and spreading it on trays. It has been found preferable to line the trays with paper to facilitate removal of the hardened product. In the most preferred embodiment, the damp mix is spread on trays at a depth of between about 1 and about 2 cm.

Preferably, the cooling is accomplished by leaving the trays in a room at ambient temperature for a time sufficient to completely solidify the wax. Naturally, the amount of time needed for cooling will depend on the specific wax and the temperature at which it was mixed. When 15 weight percent paraffin wax is used at 180° F., the trays are preferably cooled for about 4–6 hours at room temperature to thoroughly harden the mixture.

Alternatively, the trays can be placed in a refrigerated chamber in order to reduce the amount of time needed for cooling.

After cooling, the mix is generally characterized as being in the form of hard, dry lumps of various shapes and sizes. At this point, the hardened mix is ready to be treated to produce the desired range of particle sizes. This can be accomplished in various ways. Most preferably, the hardened mix is fed into a grinder which comminutes the mix into smaller particles. Other devices such as a roller mill can also be used to comminute the cooled mix. The grinder or other device is preferably equipped with a screen which will pass the desired particle size range. If desired, other techniques such as a second screen or a cyclone separator can be used to ensure a minimum particle size as well as a maximum particle size. Presently, a screen with 0.04 inch holes is used to produce the wax-coated acesulfame K particles of the most preferred embodiment.

In the most preferred embodiment, only the maximum particle size is controlled. That is, the smaller particles are not held back. As a result, the wax-coated product may also include small unbonded crystals as well as larger clusters of acesulfame K crystals held together with the wax. This condition is believed to be preferable for particular ingredients in certain gum formulations. For example, in the most preferred embodiment, this is believed to produce the effect of allowing some smaller and/or unbonded particles of the acesulfame K to be released more quickly when the gum is chewed than the acesulfame K which is bound with more wax into bigger clusters. As a result, the release profile is such that the consumer experiences sufficient sweetness initially and subsequently.

In alternative embodiments, it may be desirable to control the maximum and the minimum particle size to produce a narrower range of particle sizes. This may be desired when it is intended for all of the ingredient to have a more uniform delayed release. Moreover, it may be desired to separate out various particle sizes and then to include a predetermined blend of these sizes in the chewing gum in order to obtain a more closely controlled sweetness release profile.

After particle sizing, the above-described wax-coated powdered ingredient is ready to be incorporated into a chewing gum. The remainder of the chewing gum ingredients are seen to be noncritical to the present invention. That is, the wax-coated particles of ingredient can be incorporated into conventional chewing gum formulations in a conventional manner. The preferred chewing gum formulation is a sugar chewing gum with wax-coated acesulfame K included. However, wax-coated acesulfame K or other high-potency sweeteners may also be used in both a sugar and sugarless chewing gums to intensify and/or extend the sweetness thereof. The wax-coated ingredients may be used in either regular chewing gum or bubble gum.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component such as calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, when high-potency sweeteners are used in the present invention, the chewing gum will most likely be a sugarless gum. However, formulations containing sugar are also within the scope of the invention. Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination.

Wax-coated high-potency sweeteners of the present invention can also be used in combination with other sugarless sweeteners. Generally sugarless sweeteners include components with sweetening characteristics but are devoid of the commonly known sugars and comprise but are not limited to sugar alcohols such as sorbitol, mannitol, xylitol, hydrogenated starch hydrolysates, maltitol, and the like, alone or in any combination.

Depending on the particular sweetness release profile and shelf-stability needed, the wax-coated high-potency sweeteners of the present invention can also be used in combination with uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. Flavoring agents available in powdered form may be wax-coated by the present invention if a delayed release and/or shelf-stability are sought. Otherwise, the flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In general, chewing gum is manufacture by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent. The wax-coated ingredient of the present invention is preferably added after the final portion of bulking agent and flavor have been added.

The entire mixing procedure typically takes from five to fifteen minutes, but longer mixing times may sometimes be required. Those skilled in the art will recognize that many variations of the above-described procedure may be followed.

Figure 2:
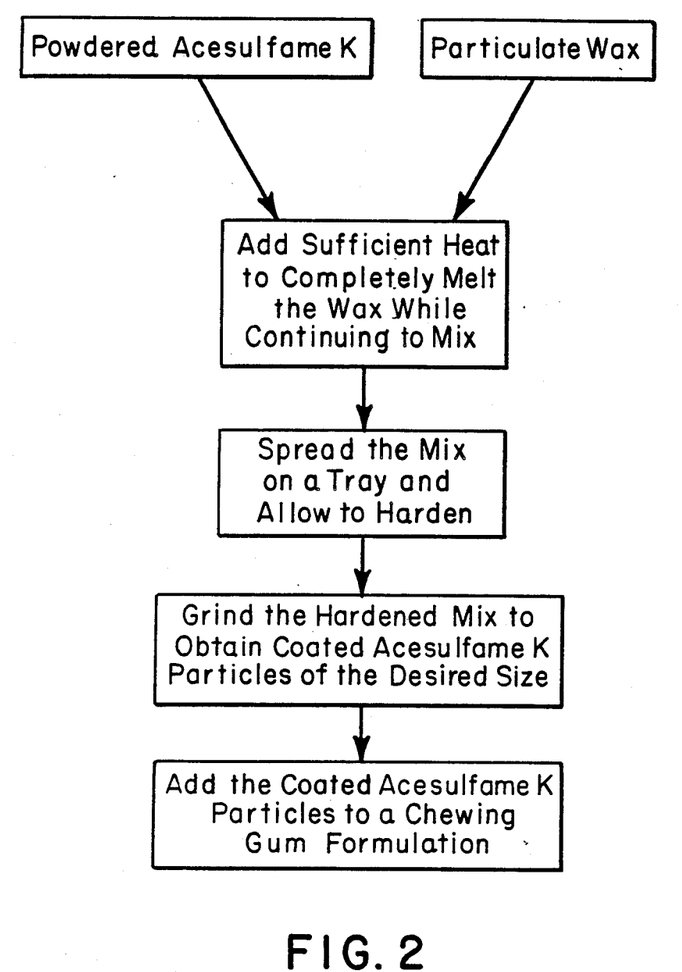
FIG. 2 is a schematic representation of an alternative method of the present invention.

FIG. 2 illustrates an alternative embodiment of the present invention. This embodiment is similar in all respects to that illustrated in FIG. 1 with the exception that the wax is added to the mixing bowl in a particulate form. Most preferably, a powdered microcrystalline wax with a melting point of about 187° F. is used in this embodiment. The wax and the powdered ingredient are blended together for a time sufficient to cause complete interdispersion of the two powders. Heat is supplied to the mixing bowl sufficient to cause the wax particles to melt. The mixing and heating are continued for a time sufficient to allow for total melting of the wax and for complete interdispersion of the molten wax with the powdered ingredient. As in the embodiment shown in FIG. 1, the amount of wax is intentionally limited in order to produce the damp mix with the characteristics described above.

EXAMPLES

The following examples are provided by way of explanation and illustration. Examples 1 through 6 used acesulfame K as the powdered ingredient. Examples 1 through 3 were incorporated into a chewing gum formulation and tested for delayed release of the acesulfame K. Example 7 used aspartame as the powdered ingredient. Examples 8-10 used a Thaumatin/Mannitol mixture as the powdered ingredient. Examples 11-13 were performed with citric acid as the powdered ingredient. Example 14 is a comparative example wherein a chewing gum was made with uncoated acesulfame K.

Example 1 was carried out according to the preferred embodiment of the present invention. In particular, 400.0 g. of acesulfame K ("Sunett ®" from HOECHST AG) was added to the bowl of a 20 qt. Hobart mixer. Hot air guns were used to heat this bowl to about 200° F. This supply of heat was continued throughout the mixing process in this and all of the examples to maintain a bowl temperature of between about 20° and about 50° F. above the melting point of the wax. In a separate container, a quantity of a polyethylene wax ("POLYWAX 500" from the Petrolite Specialty Polymers Group) with a melting point of about 187° F. was melted and heated to a temperature of between about 195° and about 205° F.

With the mixer running, a total of 156.1 g. of molten wax was added over a period of 25 minutes. This was accomplished by adding aliquots of between 10 and 30 g. every 3 to 4 minutes. After the last aliquot was added, the mixing continued for about another 2 to 5 minutes to insure complete interdispersion. The damp mix that resulted was dustless and coalesced when squeezed. The damp mix was transferred to stainless steel trays and spread to a depth of approximately 2 cm. whereupon it was allowed to cool overnight. The large clumps that resulted were ground in a FITZMILL grinder with a 0.04" screen. The resultant wax-coated acesulfame K particles had a moisture content of 0.07 weight percent, a wax content of 28.07 weight percent, and an acesulfame K content of 71.86 weight percent.

The wax-coated acesulfame K particles in this example were then incorporated into 2.8 g. sticks of an otherwise conventional sugarless peppermint flavored chewing gum. In particular, the chewing gum to which the acesulfame K particles were added consisted of the following ingredients at the listed weight percent:

| | |
|---|---|
| Sugar | 53.12% |
| Gum Base | 20.6% |
| Corn Syrup | 14.6% |
| Dextrose | 10.14% |
| Glycerin | 0.86% |
| Spearmint Flavor | 0.56% |
| Wax-Coated Acesulfame K | 0.06% |

The sugar was milled sugar. The gum base used was a conventional chewing gum base. The corn syrup was obtained from the A.E. Staley Co. and had a dextrose equivalent of 39. The dextrose was dextrose monohydrate. Tee glycerin was obtained from Proctor and Gamble Co. under the designation "96 U.S.P. Glycerin."

Example 2 was carried out the same as example with the exception that 144.1 g. of a microcrystalline wax with a melting point of about 145° F. was used in place of the polyethylene wax of example 1. The microcrystalline wax was obtained from the Witco, Sonneborn Division under the designation Multiwax. Also, 430 g. of acesulfame K were used. The resultant wax-coated particles consisted of 0.08 weight percent moisture, 5.10 weight percent microcrystalline wax, and 74.82 weight percent acesulfame K. Thereafter, these wax-coated particles were incorporated at a level of 0.056 weight percent into a chewing gum otherwise identical to that described in example 1.

Example 3 was carried out the same as example 1 with the exception that a blend of paraffin waxes with different melting points was used. In particular, the blend consisted of 25 weight percent of paraffin waxes with the following melting points 115° F., 135° F., 170° F., 180° F. These waxes were obtained from L. A. Dreyfus. About 69.1 g. of of this wax blend were added to 400.0 g. of acesulfame K. The resultant wax-coated particles consisted of 0.09 weight percent moisture, 14.73 weight percent paraffin wax, and 85.18 weight percent acesulfame K. Thereafter, these wax-coated particles were incorporated at a level of 0.067 weight percent into a chewing gum otherwise identical to that described in example 1.

Example 4 was carried out the same as example 1 with the exception that 148 g of the same polyethylene wax were added to 454 g. of acesulfame K. Accordingly, the resultant particles included 24.6 weight percent wax. The particles were incorporated into a conventional chewing gum.

Example 5 was carried out the same as example 4 with the exception that 252 g. of a paraffin wax with a melting point of about 135° F. were added to 454 g. of acesulfame K. Accordingly, the resultant particles included 35.7 weight percent wax.

Example 6 was carried out the same as example 4 with the exception that 121 g. of a paraffin and microcrystalline blend wax obtained from Witco, Sonneborn Division under the designation "G1483" were added to 454 g. of acesulfame K. Accordingly, the resultant particles included 18.2 weight percent wax.

Example 7 was carried out the same as example 1 with the exception that 111.2 g. of a paraffin wax obtained from L. A. Dreyfus under the designation "IRM 160" were added to 300.0 g. of aspartame crystals obtained from the NUTRASWEET CO. This sample of aspartame crystals was reported to have about 3 7 weight percent moisture. The wax had a melting point of about 160° F. The resultant particles included 2.08 weight percent moisture, 27.21 weight percent wax, and about 70.71 percent aspartame. The wax-coated aspartame particles were then incorporated into a sugarless chewing gum with the following formula.

| Sorbitol | 49.23% |
|---|---|
| Gum Base | 25.46% |
| Glycerin | 8.54% |
| Mannitol | 7.97% |
| Lycasin | 6.82% |
| Peppermint Flavor | 1.44% |
| Lecithin | 0.21% |
| Color | 0.05% |
| Wax-Coated Acesulfame K | 0.06% |

The sorbitol was obtained from Roquette Corporation under the designation "Neosorb P60." The gum base used was a conventional chewing gum base. The glycerin was obtained from Proctor and Gamble Co. under the designation "Superol 99.5 U.S.P. Glycerin." The mannitol was also obtained from the Roquette Corporation under the designation "Mannitol-F." The lycasin was also obtained from Roquette. The lecithin was obtained from Central Soya. The color was obtained from Warner Jenkins.

Example 8 was carried out the same as example 1 with the exception that 242 g. of the same polyethylene wax described in example 1 were added to 454 g. of a mannitol/thaumatin blend. In particular, the blend consisted of 90 weight percent mannitol and 10% weight thaumatin obtained from Tate & Lyle under the designation Spray Dried Talin. The resultant particles included 34.8 wax. The wax-coated particles were incorporated into a conventional chewing gum formulation.

Example 9 was carried out the same as example 8 with the exception that 271 g. of the paraffin wax described in example 5 were added to 454 g. of the same mannitol/thaumatin blend. Accordingly, the resultant particles included 37.4 weight percent wax.

Example 10 was carried out the same as example 8 with the exception that 228 g. of the microcrystalline-paraffin blend wax described in Example 6 were added to 454 g. of the same mannitol/thaumatin blend. Accordingly, the resultant particles included 33.4 weight percent wax.

Example 11 was carried out the same as example 1 with the exception that 149 g. of the same polyethylene wax were added to 454 g. of powdered citric acid. The citric acid was obtained from the PFIZER Chemical Co. as anhydrous citric acid powder. The resultant particles included 24.7 weight percent wax. The particles were incorporated into a conventional chewing gum formulation.

Example 12 was carried out the same as example 11 with the exception that 235 g. of the paraffin wax described in example 5 were added to 454 g. of the same citric acid powder. Accordingly, the resultant particles included 34.1 weight percent wax.

Example 13 was carried out the same as example 11 with the exception that 121 g. of the microcrystalline-paraffin blend wax described in Example 6 were added to 454 g. of the same citric acid powder. Accordingly, the resultant particles included 21.0 weight percent wax.

Comparative example 14 consisted of making a chewing gum identical to that disclosed in example 1 with the exception that the acesulfame K was not coated with wax or any material before being put into the chewing gum. In particular, uncoated acesulfame K particles were added at a level of 0.048 weight percent into a chewing gum formulation otherwise identical to that described in example 1.

An experiment was conducted to measure the release profile of a chewing gum made in examples 1-3 and comparative example 14. The experiment consisted of taking the chewing gum made in these examples and analyzing the amount of acesulfame K released at specified time intervals during chewing. As noted above, the chewing gums of these examples were identical in all respects except for the type of wax coating in examples 1-3 and the absence of any wax coating for example 14.

2.8 g. sticks of these chewing gums were chewed by 4 subjects for specified time periods and then collected. The collected pieces were then analyzed for the amount of acesulfame K remaining in the gum. As a result, it was determined how much of the acesulfame K had been released from the gum at 0.5, 1.0, 2.0, 4.0, 8.0, and 20.0 minutes. These values were averaged and converted into percentages of acesulfame K released. These values are shown in the table below and the values at the first five times are plotted on the graph shown in FIG. 3.

TABLE

| | Percentage Of Acesulfame K Released | | | |
|---|---|---|---|---|
| Time Chewed In Minutes | Example 14 | Example 1 | Example 2 | Example 3 |
| 0.5 | 49.02 | 17.78 | 19.07 | 30.23 |
| 1.0 | 64.71 | 35.56 | 39.02 | 39.53 |
| 2.0 | 80.39 | 66.67 | 73.17 | 69.77 |
| 4.0 | 96.08 | 88.89 | 87.80 | 90.70 |
| 8.0 | 98.04 | 97.78 | 97.56 | 97.67 |
| 20.0 | 100 | 100 | 100 | 100 |

Figure 3:
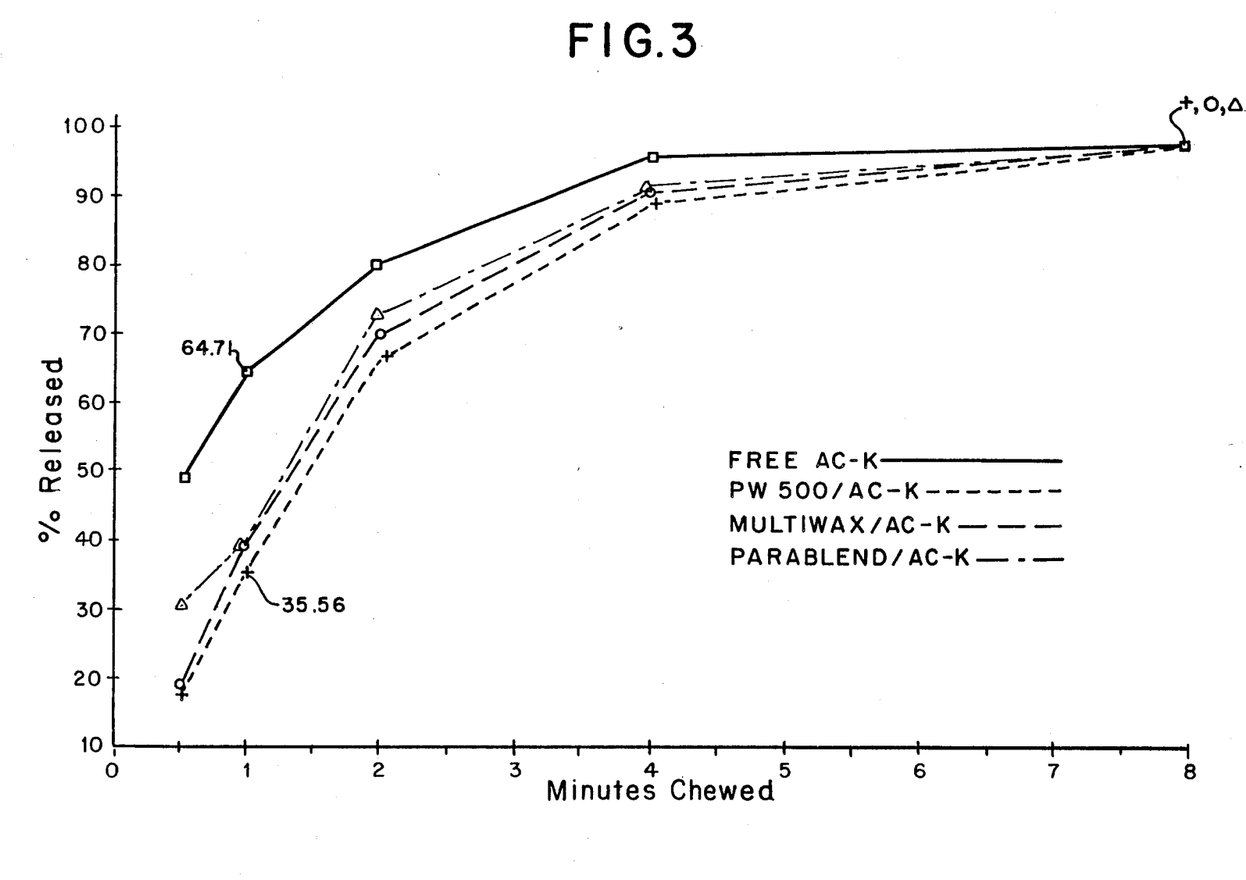
FIG. 3 is a graph comparing the release rates of acesulfame K from chewing gum.

In FIG. 3, the squares represent the values obtained from the gum in example 14, i.e. with uncoated acesulfame K. As can be seen, almost half of the acesulfame K had been released within the first 30 seconds of chewing. Also, nearly all of the acesulfame K was released within the first four minutes. Typically, the first five minutes of chewing are the most critical in consumer acceptance. Naturally, this fast release of uncoated acesulfame K would typically be undesirable in a chewing gum.

The "+" signs represent the values obtained for the chewing gum made in example 1, i.e. with the polyethylene wax. The circles represent the values obtained for the chewing gum made in example 2, i.e. with the microcrystalline wax. The triangles represent the values obtained for the chewing gum made in example 3, i.e. with the blend of paraffin waxes. As can be seen, all of these examples showed a delayed release as compared to that with uncoated acesulfame K. The blend of paraffin waxes released more in the first 30 seconds of chewing than the other examples. However, the release values were about the same at the other times. The product of example 1 appears to have the most delayed release of the acesulfame K.

In summary, a relatively simple and inexpensive process has been described for producing chewing gum with wax-coated delayed release ingredients. Although specific embodiments and examples have been described herein, it should be born in mind that these have been provided by way of explanation and illustration and that the present invention is not limited thereby Certainly modifications which are within the ordinary skill in the art to make are considered to lie within the scope of the invention as defined by the following claims, including all equivalents.

I claim:

1. A method of making chewing gum with a waxed-coated delayed release ingredient comprising the following steps:
   mixing a quantity of a powdered ingredient, said powdered ingredient being selected from the group consisting of high-potency sweeteners, flavors, and acidulants, as well as mixtures thereof, with a quantity of molten wax, which wax has a melting point above about 130° F. to produce a damp mix wherein the quantity of the powdered ingredient is between about 50 and about 90 weight percent of the damp mix and the quantity of molten wax is selected so as to produce a damp mix which is characterized as being dust free, non-flowing, and crumbly, and wherein the quantity of powdered ingredient and the molten wax remain above the melting point of the wax until completely mixed;
   allowing the damp mix to harden;
   comminuting the hardened mix to thereby obtain wax-coated particles of the ingredient within a particle size range suitable for use in chewing gum; and
   incorporating the wax-coated particles in a chewing gum formulation.

2. The method of claim 1 wherein the wax is selected from the group consisting of polyethylene wax, paraffin wax, microcrystalline wax, beeswax, carnauba wax, as well as combinations thereof.

3. The method of claim 1 wherein the powdered ingredient is a high-potency sweetener.

4. The method of claim 1 wherein the powdered ingredient is a salt of acesulfame.

5. The method of claim 1 wherein the powdered ingredient is a dipeptide sweetener selected from the group consisting of aspartame and alitame.

6. The method of claim 1 wherein the wax is melted before being added to the powdered ingredient.

7. The method of claim 1 wherein wax is added to the powdered ingredient in a particulate form which is blended with the powdered ingredient and then melted.

8. The method of claim 1 wherein the quantity of molten wax is between about 15 and about 40 weight percent of the damp mix.

9. A method of making chewing gum with a wax-coated delayed release ingredient comprising the following steps:
   providing a quantity of a powdered ingredient in a mixing bowl, said powdered ingredient being selected from the group consisting of high-potency sweeteners, flavors, and acidulants, as well as mixtures thereof,;
   gradually adding a quantity of molten wax to the mixing bowl while mixing, the wax having a melting point above about 130? F to produce a damp mix wherein the quantity of powdered ingredient is between about 50 and about 90 weight percent of the damp mix and the quantity of molten wax is selected so as to produce a damp mix which is characterized as being dust free. non-flowing, and crumbly, and wherein the quantity of powdered ingredient and the molten wax remain above the melting point of the wax until completely mixed;
   allowing the damp mix to harden;
   comminuting the hardened mix to thereby obtain wax-coated particles of the ingredient within a particle size range suitable for use in chewing gum; and
   incorporating the wax-coated particles in a chewing gum formulation.

10. The method of claim 9 wherein the wax is selected from the group consisting of polyethylene wax, paraffin wax, microcrystalline wax, beeswax, carnauba wax, as well as combinations thereof.

11. The method of claim 9 wherein the wax is a blend of a polyethylene wax and a paraffin wax.

12. The method of claim 9 wherein the powdered ingredient is a high-potency sweetener.

13. The method of claim 9 wherein the powdered ingredient is a salt of acesulfame.

14. The method of claim 9 wherein the powdered ingredient is a dipeptide sweetener selected from the group consisting of aspartame and alitame.

15. The method of claim 9 wherein the quantity of molten wax is between about 15 and about 40 weight percent of the damp mix.

16. A method of making chewing gum with a wax-coated delayed release ingredient comprising the following steps:
   providing a quantity of a powdered ingredient in a mixing bowl, said powdered ingredient being selected from the group consisting of high-potency sweeteners, flavors, and acidulants, as well as mixtures thereof,;
   gradually adding a quantity of molten wax to the mixing bowl while mixing, the wax having a melting point above about 130° F., the quantity of molten wax being selected to produce a damp mix which is characterized as being dust free, non-flowing, and crumbly, wherein the quantity of powdered ingredient is between about 50 and about 90 weight percent of the damp mix, and wherein the quantity of powdered ingredient and the molten wax remain above the melting point of the wax until completely mixed;
   allowing the damp mix to harden;
   comminuting the hardened mix to thereby obtain coated particles of the ingredient within a particle size range suitable for use in chewing gum; and
   incorporating the coated particles in a chewing gum formulation.

17. The method of claim 9 wherein the powdered ingredient is a salt of acesulfame.

18. The method of claim 9 wherein the quantity of molten wax is between about 15 and about 40 weight percent of the damp mix.

19. A chewing gum made according to the method of claim 1.

20. A chewing gum made according to the method of claim 4.

21. A chewing gum made according to the method of claim 8.

22. A chewing gum made according to the method of claim 13.

23. A chewing gum made according to the method of claim 16.

24. A chewing gum made according to the method of claim 17.

UNITED STATES PATENT AND TRADEMARK OFFICE
CERTIFICATE OF CORRECTION

PATENT NO. : 4,885,175
DATED : December 5, 1989
INVENTOR(S) : Steven E. Zibell

It is certified that error appears in the above-identified patent and that said Letters Patent is hereby corrected as shown below:

In column 4, line 40, before "important" please insert --also--.

In column 5, line 42, please delete "The preferred method of adding the"; and on line 43, start a new paragraph before "molten" by inserting --The preferred method of adding the--.

In column 10, line 14, please delete "Tee" and substitute therefor --The--.

In column 10, line 17, after "example" please insert --1--.

In column 10, line 24, please delete "5.10" and substitute therefor --25.10--.

In column 10, line 34, after "points" please insert --:--.

In column 10, line 66, please delete "3 7" and substitute therefor --3.7--.

UNITED STATES PATENT AND TRADEMARK OFFICE
CERTIFICATE OF CORRECTION

PATENT NO. : 4,885,175

DATED : December 5, 1989

INVENTOR(S) : Steven E. Zibell

It is certified that error appears in the above-identified patent and that said Letters Patent is hereby corrected as shown below:

Column 13:

In claim 9, line 11, please delete "130? F" and substitute therefor --130°F--; and in line 16, after "free" please delete "." and substitute therefor --,--.

Signed and Sealed this

Tenth Day of November, 1992

*Attest:*

DOUGLAS B. COMER

*Attesting Officer*     *Acting Commissioner of Patents and Trademarks*